United States Patent [19]
Waters

[11] 3,778,130
[45] Dec. 11, 1973

[54] HOLOGRAM FORMATION WITH A SPECKLE REFERENCE POINT SOURCE

[75] Inventor: James P. Waters, Rockville, Conn.

[73] Assignee: United Aircraft Corporation, East Hartford, Conn.

[22] Filed: Mar. 30, 1972

[21] Appl. No.: 239,737

[52] U.S. Cl. .............................. 350/3.5, 356/109
[51] Int. Cl. ...................................... G02b 27/00
[58] Field of Search.................. 350/3.5; 356/106, 356/109, 113; 73/67.5, 67.6, 67.7, 71.3

[56] References Cited
UNITED STATES PATENTS

| | | | |
|---|---|---|---|
| 3,698,787 | 10/1972 | Mueller et al. | 350/3.5 |
| 3,633,986 | 1/1972 | Broussand et al. | 350/3.5 |
| 3,661,437 | 5/1972 | Mottier | 350/3.5 |
| 3,540,790 | 11/1970 | Rosen | 350/3.5 |
| 3,666,344 | 5/1972 | Mottier | 350/3.5 |

Primary Examiner—Ronald J. Stern
Attorney—Anthony J. Criso

[57] ABSTRACT

Disclosed are hologram systems in which the necessary degree of vibration isolation of the object being recorded is substantially less than is required in conventional holographic systems. A source beam is divided into a first beam and a second beam: the first beam is expanded and directed onto the object being recorded to form an object bearing beam; the second beam is focused onto a diffusely scattering surface to form a reference beam that self compensates for vibratory motion of the object.

7 Claims, 4 Drawing Figures

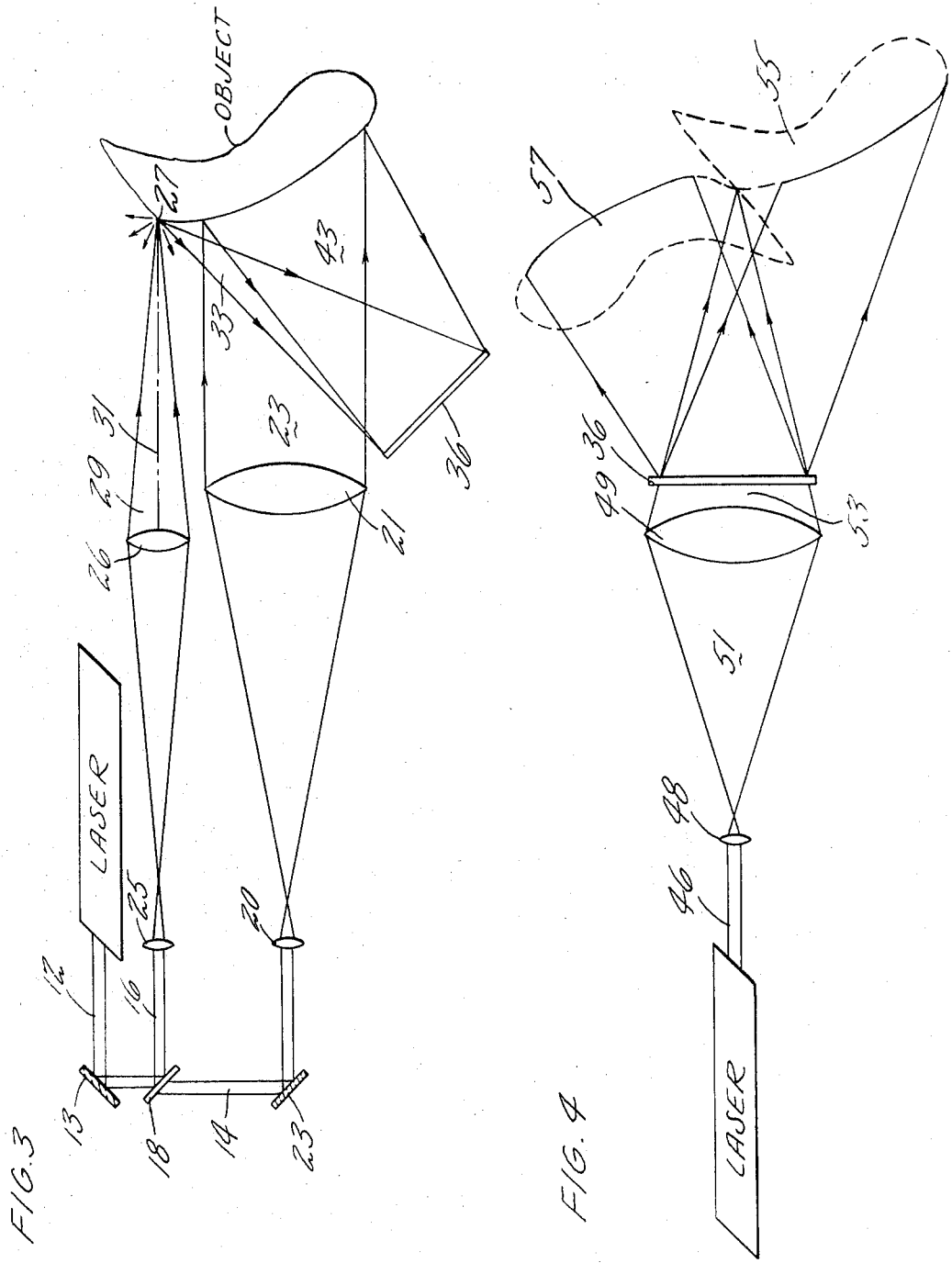

HOLOGRAM FORMATION WITH A SPECKLE REFERENCE POINT SOURCE

BACKGROUND OF THE INVENTION

1. Field of Invention

This invention relates to holography and more particularly to hologram construction and reconstruction in which the vibration isolation requirements of the object are significantly reduced.

2. Description of the Prior Art

Several methods have been developed for improved hologram techniques in which the effects of vibratory motion of the object being recorded are somehow reduced or minimized. One such system is described by H. W. Rose and H. D. Pruett, Appl. Opt. 7, 87 (1968) and relies on an electronic feedback servo system to compensate for the motion of the object. In such a system, a sensing device monitors the interference fringe pattern which is formed by the reference beam and the object bearing beam and this information is fed back through a servo control mechanism which positions an appropriate mirror in the beam path to compensate for the motion of the fringes. Electronic feedback control is undesirable because of the complexity and expense inherent in such a system; further, unless the object being recorded is transparent, the signal to noise ratio is low making implementation of a system a difficult practical problem. An alternate method of compensating for motion of the object recorded is to scan the holographic reference beam in order to minimize the time over which the object is being recorded and is described by J. C. Palais, App. Opt. 9, 709 (1970). This technique can be effective depending upon the frequency of the motion of the object. As a practical matter, the required scan is often too fast for the sensitivity of the film recording the hologram and causes a dim hologram. Another technique for compensating for the motion of the object is to attach a mirror directly to the object so that the reference beam is automatically compensated for any motion of the object during the recording process. The system is described by V. J. Corcoran et al., Appl. Opt. 5, 668 (1966) and it can be effective, depending on the intent of the holograph, however, in some cases it is infeasible. For example, if vibratory analysis were being performed on an object, the attachment of a mirror to the object distorts the information recorded, reducing its usefulness. Still another method of object motion compensation is described by W. T. Cathey, Jr., U.S. Pat. No. 3,415,587 in which spatial filtering of the reference beam in the hologram-forming process is provided before the reference beam strikes the holographic plate. In this system the source beam is generally a reflected wave from the object being recorded. The reflected wave is split; one leg of the split beam is spatially filtered to form the reference beam while the other leg is directed onto the holographic plate where the two legs interfere with one another to form the hologram. This technique is effective, however, its efficiency is low because the intensity in the reference beam is reduced considerably during the spatial filtering procedure. This system is further limited in that it does not lend itself to conventional holographic interferometry. An additional system which is known in the art and also compensates for motion of the object when the hologram is being made, involves the use of a reference beam from an extended diffuse source as is described by L. Rosen in U.S. Pat. No. 3,535,013. The primary drawbacks to this system is that it cannot be used for holographic interferometry and the reconstructed image has limited viewing angles.

SUMMARY OF THE INVENTION

An object of the present invention is to avoid the vibration isolation requirements of the object being recorded which are inherent in conventional holographic techniques.

Another object of the present invention is to form a hologram with a diffusely scattered point source reference beam.

According to the present invention, a hologram is made with a speckle pattern reference beam which automatically compensates for vibratory motion of the object being recorded; a source beam of coherent radiation is divided into a first beam which illuminates the object being recorded and produces an object bearing beam, and a second beam which is focused onto a diffusely scattering surface that is a surface either on the object being recorded or on another scattering means which had the same vibratory motions as the object, to form a point source reference beam that interferes with the object bearing beam on a photographic plate to produce the hologram.

The present invention substantially reduces the vibration isolation requirements of an object without any compromise of ability to practice the conventional continuous wave, (time average, double exposure or real time) and pulsed hologram procedures. In addition, this technique allows a hologram construction and reconstruction optical arrangement which is relatively compact. Another advantage of this invention is that the residual fringes which may occur between recordings of pulse holographic interferograms can be eliminated. An especially desirable feature of this invention is its ability to produce several holograms simultaneously without having to introduce additional reference beams for each individual hologram; a single diffuse scattering point source can form the reference beams for several holograms. In addition, the system can be used for vibration phase analysis in which the relative phase between different parts of a vibrating object is discernible. Further, the masking effects of motion of the object under investigation caused by stress-inducing procedures in nondestructive testing can be reduced thereby making the anomoly being sought in the fringe pattern more conspicuous.

The foregoing and other objects, features and advantages of the present invention will become more apparent in the light of the following detailed description of preferred embodiments thereof as illustrated in the accompanying drawing.

BRIEF DESCRIPTION OF THE DRAWING

FIG. 3 is a schematic diagram of a preferred embodiment of the present invention in which the reference beam is formed at a diffuse scattering point on the object itself; and FIG. 4 is a schematic diagram of the apparatus used to reconstruct the hologram formed with the apparatus shown in FIG. 3.

DESCRIPTION OF THE PREFERRED EMBODIMENT

The formation of a hologram with a reference beam formed by the scattering of a beam of coherent energy by a diffuse surface was heretofore considered completely impractical due to the extreme difficulty involved in attempting to match during the reconstruction process, the phase characteristics of such a reference beam. The present invention takes an entirely different approach and discloses that if a source of coherent energy is focused to a beam having a sufficiently small diameter and is diffusely scattered by a suitable surface, the scattered energy sufficiently approximates a specular point source that an acceptable quality hologram can be formed using such scattered energy as the reference beam. Further, a hologram formed in this manner can be reconstructed to form an image of acceptable quality with a conventional specular point source. The loss in resolution inherent in this system due to the use of a diffuse point source as the reference beam and a specular point source to reconstruct the image is surprisingly small.

The gist of the present invention is the compensation for vibratory movement by an object being recorded as a hologram, with the use of a speckle pattern reference beam formed by focusing a source of coherent energy at a surface which is either on or vibrationally identical to the object being recorded. When a beam of electromagnetic radiation is incident upon a smooth surface, that is, one having surface discontinuities smaller than the wavelength of the incident radiation, the surface redirects the incident radiation in a specular manner. Alternatively, if the wavelength of the incident radiation is small with respect to the surface discontinuities, the radiation scattered by the surface forms a speckle pattern which is characteristic of the surface. The beam pattern is a plurality of randomly located spots or islands of intense radiation such that a cross section through the beam is not of constant brightness. The precise pattern of the spots is determined by the diameter of the focused spot size and separation of the discontinuities on the scattering surface and it is varied by changing the relationship between these parameters. As a practical matter, the speckle pattern can be changed by control of the focus of the incident beam. When the diameter of the incident beam is made less than the characteristic size of the surface discontinuities the scattered energy no longer contains a speckle pattern, and the incident beam undergoes essentially specular reflection.

Figure 1:
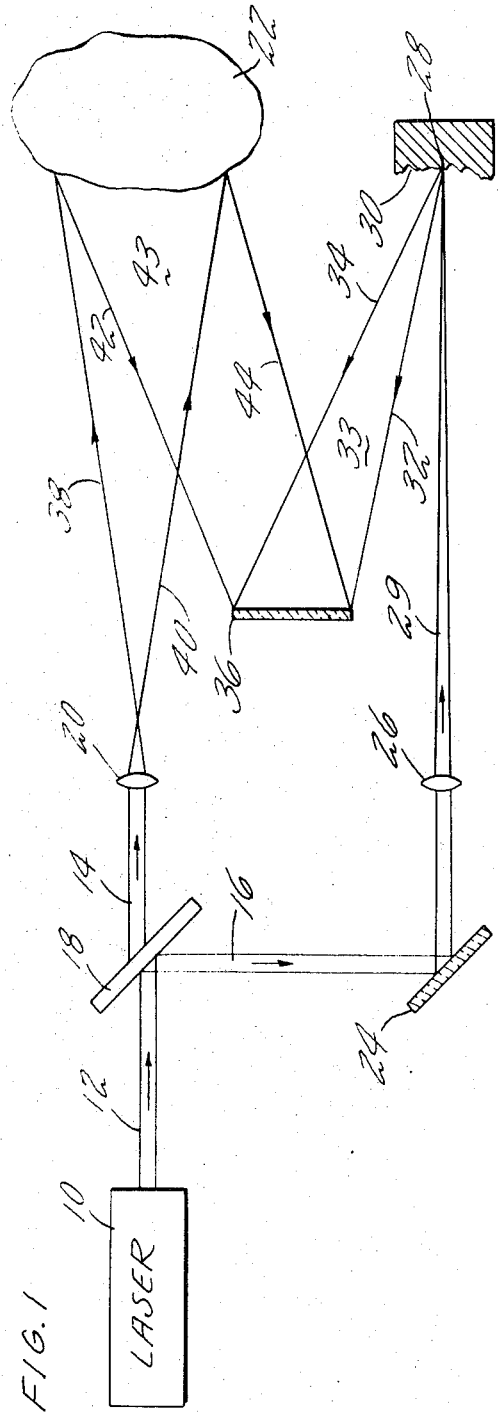
FIG. 1 is a schematic diagram of the apparatus used in the construction of a hologram in accordance with the present invention.

A simplified system used in the construction of a hologram in accordance with the present invention is shown in FIG. 1. A laser 10 provides a source beam 12 of coherent radiation which is divided into a first beam 14 and a second beam 16 by a beam splitter 18. The first beam passes through an expanding lens 20 which increases the cross section of the beam sufficiently to illuminate the surface of an object 22. The second beam is reflected by a mirror 24 and directed through a focusing lens 26 which forms an incident beam 29 that is focused at a point source 28 on a surface 30 that diffusely scatters radiation incident thereon. The second beam is scattered from the surface in many directions including the envelope defined by ray paths 32, 34 which describe the solid angle subtending a holographic plate 36. The surface 30 can either be on the object itself or on an independent scattering means which has the same vibratory motion as the object.

To construct the hologram with the apparatus described in FIG. 1, the laser is directed onto the beam splitter to provide the first and second beams. The first beam when suitably expanded by the lens 20 forms an envelope defined by the ray paths 38, 40. The beam is scattered by the object 22 to form an object bearing beam 43, and the envelope defined by the rays 42, 44 is intercepted by the holographic plate 36. Concomitantly, the second beam is scattered off the diffuse surface 30 to form a reference beam 33 and that portion of the scattered energy within the envelope defined by the rays 32, 34 is also intercepted by the holographic plate. The interference pattern formed by the object bearing beam and the reference beam forms a hologram at the holographic plate.

Figure 2:
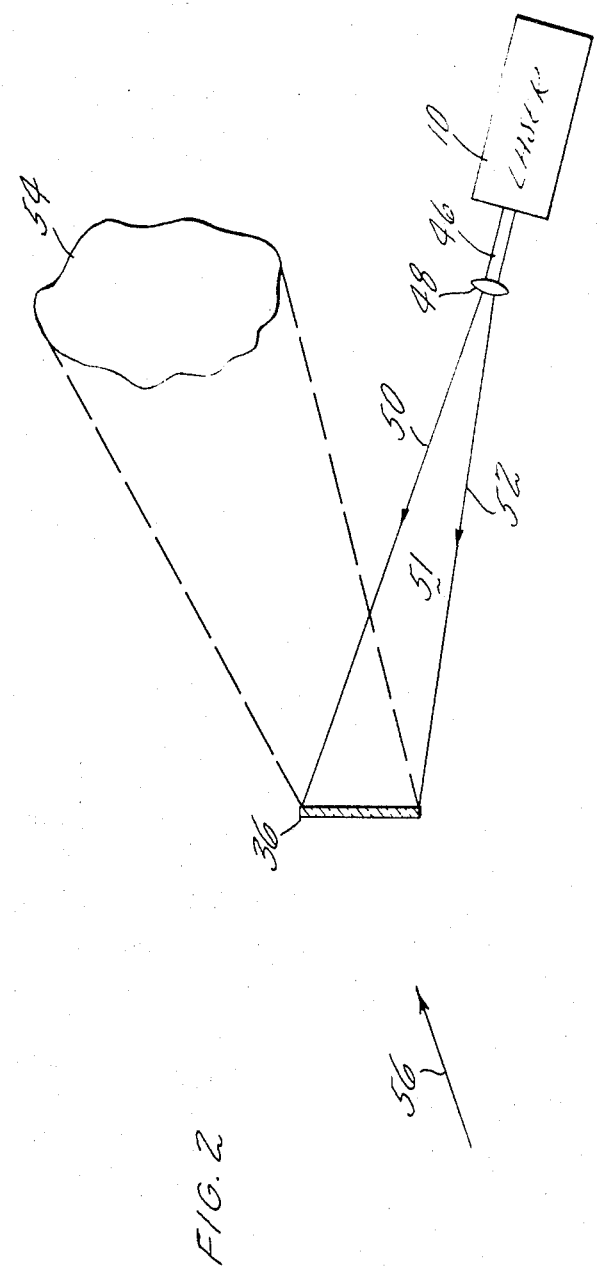
FIG. 2 is a schematic diagram of the apparatus used in the reconstruction of a hologram such as is made with the apparatus of FIG. 1.

A typical system used to reconstruct a hologram such as the one formed in the apparatus shown in FIG. 1 is shown schematically in FIG. 2. The laser 10 provides a source beam 46 of coherent radiation which is passed through a beam expanding lens 48 forming a reconstruction beam 51 in an envelope defined by the rays 50 and 52. The reconstruction beam strikes the holographic plate 36 which in turn diffracts the reconstruction beam and causes a virtual image 54 to occur at the location shown when viewed from a direction 56.

In addition to continuous wave holography, the present invention is particularly suited for the production of pulsed holographic interferograms. In this form of holography, the object being recorded often undergoes vibratory motions due to outside influences, the object moving during the period between which two holographic exposures are being made. The result is that residual fringes occur in the interferogram which are not at all descriptive of the event being studied on the object. By forming a speckle pattern reference beam on a portion of the object surface, any outside forces which cause the object being recorded to move between pulses affects the reference beam in exactly the same manner thereby eliminating the residual fringes.

Another very useful application of the present invention involves the determination of the phase differences between different positions on a vibrating object. To establish such phase differences, a speckle pattern reference beam source is established by focusing a source of coherent radiation at a spot on the surface of the object being recorded at which the phase is to be determined with respect to other points on the surface of the object. Then the object is vibrated and a time average interferometric hologram is formed. When the image of the surface is reconstructed, those portions of the surface of the object which had the same phase and amplitude as the point at which the speckle pattern was produced appear as very bright areas in the image.

The quality of the images which can be produced with this invention in any given optical system can be improved by controlling the illumination beam divergence and the angular acceptance of holographic plate. Proper control of these parameters also allows an increase in the surface area that can be recorded. Without some special provisions, a usable quality hologram can be recorded only over surfaces having a limited area (provide some sort of limitation that defines the approximate limits involved). The phase of the reference beam during construction and reconstruction of the hologram can be suitably matched to the phase of the entire field illuminated on the surface being recorded by (1) illuminating the object with a collimated beam, (2) aligning the illuminated beam so that it is parallel to the central ray of the focused reference beam and (3) recording the object in the far field or at the focal plane of a lens positioned between the object and the hologram. These features are brought out in FIG. 3 in which the output beam 12 is redirected by a mirror 13 to the beam splitter 18 which forms the first beam 14 and the second beam 16. A mirror 23 directs the first beam to the lens 20 which expands and further directs it onto a collimating lens 21, causing the object to be illuminated with a beam 23 of collimated coherent radiation. The second beam 16 is expanded with an expanding lens 25 and focused with a focusing lens 26 to provide a point source 27 of diffusely scattered energy on the surface of the object. The incident beam 29 has a central ray 31 which is aligned parallel to the collimated beam 23. A hologram is formed by the interaction of the reference beam 33 and the object bearing beam 43 at the plate 36.

The hologram produced with the apparatus shown in FIG. 3 is typically reconstructed with an apparatus as shown in FIG. 4. The source beam 46 is expanded by the lens 48 to form the reconstruction beam 51 which is focused by a focusing lens 49. A focused reconstruction beam 53 is transmitted through the holographic plate 36 to form an orthoscopic real image 55 and a pseudoscopic virtual image 57 with a region of overlap as shown. If the focusing lens 49 is omitted two virtual images occur between laser and holographic plate.

In viewing a hologram in which the reference beam is created at a point on the object being recorded, some provisions must be made to separate the orthoscopic and pseudoscopic virtual images which appear during reconstruction to be symmetrically centered about a reference point. If the two images overlap, the image quality of the orthoscopic image, which is usually the desired image, is compromised. As a practical matter, this sort of problem can be avoided by forming the reference beam to one side, or preferably outside of, the field of illumination on the object as is shown in FIG. 3.

When a source of coherent radiation is focused onto a diffusely scattering surface in accordance with the present invention, an omnidirectional spot source of speckle reference illumination is formed. Therefore, a plurality of holograms of the surface illuminated can be formed simultaneously from all possible viewing angles without having to provide an individual reference beam for each of the holograms being created.

Although the invention has been shown and described with respect to preferred embodiments thereof, it should be understood by those skilled in the art that the foregoing and various other changes and omissions in the form and detail thereof may be made therein without departing from the spirit and the scope of the invention.

Having thus described a typical embodiment of my invention, that which I claim as new and desire to secure by Letters Patent of the United States is:

1. Apparatus for producing a hologram of an extended diffusely scattering object comprising:
    means for providing a source beam of coherent radiation;
    means for dividing the source beam into a first beam and a second beam;
    means for expanding the first beam to illuminate an extended diffusely scattering surface of interest on the object and to produce an object bearing beam;
    means for diffusely scattering the second beam;
    means for focusing the second beam to a point on the surface of the diffusely scattering means to produce a speckle point source reference beam; and
    means, positioned to directly receive the light scattered from the object and from the speckle point source, for recording the wave pattern due to the interference of the object bearing beam and the reference beam.

2. Invention according to claim 1 wherein the means for diffusely scattering the second beam is a surface on the object being recorded.

3. The invention according to claim 1 wherein the means for diffusely scattering the second beam is a scattering means separate from the object.

4. The invention according to claim 1 including means for expanding the second beam, the expansion means being positioned between the second beam focusing means and the beam dividing means.

5. The method of forming a hologram of an extended diffusely scattering object comrpising the steps of:
    providing a source beam of coherent radiation;
    dividing the source beam into a first beam and a second beam;
    expanding the first beam;
    scattering the first beam with the surface area of an extended diffusely scattering object being recorded;
    focusing the second beam which has a central axis, to a point on a diffusely scattering surface to form a speckle reference point surface; and
    recording the wave pattern resulting from the interference of the radiation scattered by the surface being recorded and the radiation scattered by the diffuse surface at a position directly receiving the scattered radiation.

6. The method according to claim 5 including after the step of expanding the first beam the additional step of collimating the expanded first beam.

7. The method according to claim 6 including after the step of focusing the second beam the additional step of aligning the central axis of the second beam in a direction which is parallel to the collimated and expanded first beam.

* * * * *

PO-1050
(5/69)

UNITED STATES PATENT OFFICE
CERTIFICATE OF CORRECTION

Patent No. 3,778,130                    Dated December 11, 1973

Inventor(s)   JAMES P. WATERS

It is certified that error appears in the above-identified patent and that said Letters Patent are hereby corrected as shown below:

Column 6, Claim 5, line 45    "surface" should read -- source --

Signed and sealed this 21st day of May 1974.

(SEAL)
Attest:

EDWARD M. FLETCHER, JR.                C. MARSHALL DANN
Attesting Officer                      Commissioner of Patents